(12) United States Patent
Uno et al.

(10) Patent No.: US 8,716,894 B2
(45) Date of Patent: May 6, 2014

(54) SERIES-PARALLEL RECONFIGURABLE CELL VOLTAGE EQUALIZATION CIRCUIT DESIGNED USING MOSFET AS SWITCHES THEREOF, AND DRIVER CIRCUIT THEREOF

(75) Inventors: Masatoshi Uno, Sagamihara (JP); Akio Kukita, Sagamihara (JP); Kazushige Ito, Fussa (JP); Tsutomu Sekido, Fussa (JP); Kaoru Nagata, Fussa (JP); Kazuhiro Shoji, Fussa (JP)

(73) Assignees: Japan Aerospace Exploration Agency, Tokyo (JP); Japan Capacitor Industrial Co., Ltd., Tokyo (JP)

( * ) Notice: Subject to any disclaimer, the term of this patent is extended or adjusted under 35 U.S.C. 154(b) by 329 days.

(21) Appl. No.: 13/283,519

(22) Filed: Oct. 27, 2011

(65) Prior Publication Data

US 2012/0286578 A1 Nov. 15, 2012

(30) Foreign Application Priority Data

May 13, 2011 (JP) ................................. 2011-108652
Aug. 2, 2011 (JP) ................................. 2011-169247

(51) Int. Cl.
*H02J 1/00* (2006.01)
(52) U.S. Cl.
USPC .......................................................... 307/77
(58) Field of Classification Search
USPC .............. 307/77, 71; 326/61, 62; 315/111.01
See application file for complete search history.

(56) References Cited

U.S. PATENT DOCUMENTS

| | | | | |
|---|---|---|---|---|
| 5,656,915 | A | * | 8/1997 | Eaves ............................. 320/118 |
| 7,239,194 | B2 | * | 7/2007 | Azrai et al. .................... 327/536 |
| 8,106,542 | B2 | * | 1/2012 | Lai ................................. 307/150 |
| 8,310,177 | B2 | * | 11/2012 | Naumann et al. ............. 318/139 |

FOREIGN PATENT DOCUMENTS

| | | |
|---|---|---|
| JP | 2008-219964 | 9/2008 |
| JP | 4352183 B2 | 10/2009 |

OTHER PUBLICATIONS

Machine translation of drawings for JP 2008-219964-A, Sep. 2008, Uno et al.*
Machine translation of claims and detailed description for JP 2008-219964-A, Sep. 2008, Uno et al.*
F. Ueno, et al., "A DC-AC converter using a switched-capacitor transformer with tapped capacitors string." IEICE (Institute of Electronics, Information and Communication Engineers) Technical Report, vol. 92, No. 461, pp. 15-20 (Feb. 1993) [with partial translation].

(Continued)

*Primary Examiner* — Rexford Barnie
*Assistant Examiner* — Daniel Kessie
(74) *Attorney, Agent, or Firm* — Blakely, Sokoloff, Taylor & Zafman LLP

(57) ABSTRACT

It is an object to provide a circuit for equalizing voltages of energy storage cells, with less number of element and simpler circuit configuration than ever before.
A plurality of field-effect transistors are arranged such that each of a plurality of parallel circuits formed, in one of connection states attained by switching of the switches, by connecting in parallel energy storage cells to perform mutual charging and discharging, includes a field-effect transistor adapted to avoid blocking a current having one of opposite polarities in the each of the plurality of parallel circuits, and a field-effect transistor adapted to avoid blocking a current having the other polarity in the each of the plurality of parallel circuits. This makes it possible to perform a voltage equalization operation using a small number of transistors.

9 Claims, 16 Drawing Sheets

(56) References Cited

OTHER PUBLICATIONS

Ming Xu, et al., "Voltage Divider and its Application in the Two-stage Power Architecture," Proc. IEEE APEC, pp. 499-505 (Mar. 19-23, 2006).

Masatoshi Uno, et al., "Electric Double-Layer Capacitor Module with Series-Parallel Reconfigurable Cell Voltage Equalizers," IEEJ (The Institute of Electrical Engineers of Japan), vol. 131, No. 5, pp. 729-738 (2011) [with Extended English Summary].

Office Action for Japanese Patent Application No. 2011-169247, 3 pages, (Jun. 28, 2012).

* cited by examiner

1

US 8,716,894 B2

SERIES-PARALLEL RECONFIGURABLE CELL VOLTAGE EQUALIZATION CIRCUIT DESIGNED USING MOSFET AS SWITCHES THEREOF, AND DRIVER CIRCUIT THEREOF

TECHNICAL FIELD

The present invention relates to a cell voltage equalization circuit for equalizing cell voltages of a plurality of energy storage cells each composed of a capacitor, an electric double-layer capacitor, a lithium ion capacitor, a secondary battery or the like. In particular, the present invention relates to a series-parallel reconfigurable cell voltage equalization circuit adapted to be operated according to switching of a field-effect transistor (FET) switch, such as a metal-oxide semiconductor field-effect transistor (MOSFET) switch.

BACKGROUND ART

Generally, as a prerequisite to operating a certain device by an electric power, it is necessary to perform power feeding within a given operating voltage range which is determined by characteristics of the device. Further, an energy storage-type power supply system usable, for example, as an uninterruptible power supply (UPS) for emergency purposes, is required to have a sufficiently high capacitance so as to enable a prolonged operation in a situation where no electric power is externally fed thereto. Considering the above needs, in cases where an energy storage cell composed of a capacitor, an electric double-layer capacitor, a lithium ion capacitor, a secondary battery or the like is used as a power supply, as an effective way of obtaining a desired output voltage and capacitance, a power supply system may be constructed by connecting a plurality of energy storage cells in series and in parallel to form an energy storage module. In the power unit, in order to avoid problems, such as a problem that a high voltage is applied to only a part of the energy storage cells to cause rapid degradation thereof and a problem that only a part of the energy storage cells contribute to electric discharge without effectively utilization of energy stored in the remaining energy storage cells, it is also effective to operate the energy storage module while performing mutual charging and discharging between the energy storage cells to equalize voltages of the energy storage cells.

Such an energy storage module adapted to be operated while equalizing the voltages of the energy storage cells has been proposed by the inventors of the present invention (the following Patent Document 1: the invention described in the Patent Document 1 will hereinafter be referred to as "the previous patented invention").

One example of an energy storage module according to the previous patented invention is illustrated in FIG. 1. The energy storage module illustrated in FIG. 1 comprises: a first series circuit constructed by connecting three energy storage cells $B_{1B}$, $B_{2B}$, $B_{3B}$ in series; a second series circuit constructed by connecting two energy storage cells $B_{1A}$, $B_{1A}$ in series; a third series circuit constructed by connecting two energy storage cells $B_{2C}$, $B_{3C}$ in series; a first switch group consisting of six switches $S_{a1}$ to $S_{a6}$; and a second switch group consisting of six switches $S_{b1}$ to $S_{b6}$. During operation, under control of a driver (FIG. 1), switching is performed between a first connection state as illustrated in FIG. 2 which is to be attained when each of the switches $S_{a1}$ to $S_{a6}$ making up the first switch group is turned on (i.e., set to an ON state), and a second connection state as illustrated in FIG. 3 which is to be attained when each of the switches $S_{b1}$ to $S_{b6}$ making up the second switch group is turned on (i.e., set to an ON state). Thus, each of the energy storage cells making up the energy storage module is subjected to mutual charging and discharging with respect to all of the remaining energy storage cells other than itself, directly or indirectly (through other energy storage cells), so that a variation between respective ones of the voltages of the energy storage cells will move toward being eliminated. In the energy storage module illustrated in FIG. 1, in order to allow a composite capacitance of parallel-connected energy storage cells (which are connected to other parallel-connected energy storage cells in series) to be kept constant in both of the first and second connection states, a ratio of a capacitance of each of the energy storage cells $B_{1A}$, $B_{2A}$, $B_{2B}$, $B_{2C}$, $B_{3C}$ to a capacitance of each of the energy storage cells $B_{1B}$, $B_{3B}$ is set to 1:2. When the energy storage module is constructed by selecting the capacitance ratio in the above manner, a variation in voltage across each of rows of the parallel-connected energy storage cells will move toward being eliminated in each of the first and second connection states, so that it becomes possible to more quickly equalize the voltages of the energy storage cells.

In the previous patented invention, it is proposed to use a semiconductor switch as the switch constituting the first and second switch groups. However, neither a specific semiconductor switch to be used, nor a specific circuit configuration of a driver circuit for driving the semiconductor switch, is presented. Considering that, in the energy storage module according to the previous patented invention, a direction of current which promotes the mutual charging and discharging depends on a magnitude relationship between moment-to-moment voltages of the parallel-connected energy storage cells (i.e., in a design phase, the current direction cannot be determined to be one direction), each of the switches in an ON state needs to avoid blocking a current from flowing bidirectionally between the energy storage cells therethrough. Further, in order to prevent the mutual charging and discharging between the energy storage cells from occurring through the switches in an OFF state, each of the switches in the OFF state needs to bidirectionally block a current from flowing between the energy storage cells therethrough. In a design task for the energy storage module according to the previous patented invention, a problem will arise as to how each of the switch groups is constructed to meet the above needs.

The switch groups capable of meeting the above needs may be constructed by using a bidirectional switch as each of the switches making up the switch groups (i.e., a switch adapted, in its ON state, to avoid any blocking of bidirectional currents, and, in its OFF state, to bidirectionally block a current). One example of such a bidirectional switch is disclosed in the following Non-Patent Document 1.

A structure of a bidirectional switch disclosed in the Non-Patent Document 1 is illustrated in FIG. 4. The switch 100 illustrated in FIG. 4 comprises two MOSFETs in each of which a source electrode is connected to a base electrode, wherein the MOSFETs are integrated into one switch by connecting the source electrodes together and connecting respective gate electrodes of the MOSFETs together. In the switch 100, upon applying a gate voltage, each of the MOSFETs is turned on to enable a current to bidirectionally flow therethrough (considering that a parasitic diode which allows a current to flow from the source electrode to a drain electrode is formed in each of the MOSFETs, a conceptual pathway of a current which flows when each of the MOSFETs is turned on, is indicated by one of the two arrowed dotted lines in FIG. 5). On the other hand, when each of the MOSFETs is turned off due to no application of the gate voltage, a current flow in a direction indicated by each of the two arrowed dotted lines in FIG. 6 is blocked by the action of the parasitic diode formed in one of the MOSFETs.

The Non-Patent Document 1 also discloses a driver circuit for driving the switch 100 (FIG. 7). The driver circuit 200 illustrated in FIG. 7 comprises two photovoltaic couplers 201, 202, and two photo couplers 203, 204. The switch 100 is driven in such a manner that a switch $\Phi_{Oi}$ is turned on to allow a driving voltage from the photovoltaic couplers 201, 202 to be applied to the gate electrode of the switch 100 so as to turn on the switch 100, and then the switch $\Phi_{Oi}$ and a switch $\overline{\Phi_{Oi}}$ are turned off and turned on, respectively, to short-circuit between the gate electrode and the source electrode of the switch 100 to release electric charges stored between the gate and source electrodes so as to turn off the switch 100.

The energy storage module according to the previous patented invention may be operated by employing the switch 100 disclosed in the Non-Patent Document 1 as each of the switches in the energy storage module illustrated in FIG. 1, and using the driver circuit 200 to drive these switches. However, the above switch is structurally complicated and uneconomical, in that the number of MOSFETs is required to be twice the number of the switches. Moreover, the driver circuit 200 requires two photovoltaic couplers and two photo couplers. In view of circuit simplification and cost reduction, it is desirable to drive each switch by a driver circuit with less number of elements.

LIST OF PRIOR ART DOCUMENTS

Patent Documents

Patent Document 1: JP 4352183 B

Non-Patent Documents

Non-Patent Document 1: F. Ueno, T. Inoue, I. Oota, I. Harada and K. Ishimatsu, "A DC-AC converter using a switched-capacitor transformer with tapped capacitors string", IEICE (Institute of Electronics, Information and Communication Engineers) Technical Report, Vol. 92, No. 461, pp. 15-20

SUMMARY OF THE INVENTION

Problem to be Solved by the Invention

In view of the above circumstances, it is an object of the present invention to provide a switch group having a simpler configuration than ever before, as the switch group for constituting the energy storage module according to the previous patented invention, to thereby provide a cell voltage equalization circuit having a simple circuit configuration. It is another object of the present invention to provide a system for driving the switch group by a driver circuit having a simpler configuration than ever before, to thereby achieve simplification and cost reduction for the entire system.

Means for Solving the Problem

In order to achieve the above objects, the present invention provides a voltage equalization circuit which comprises: a first series circuit constructed by connecting n energy storage cells in series (wherein n is an integer of 2 or more); second and third series circuits each constructed by connecting (n−1) energy storage cells in series; and first and second switch groups. The voltage equalization circuit is configured to: when each of a plurality of switches making up the first switch group is turned on, attain a first connection state in which each k-th energy storage cell constituting the first series circuit (wherein k is an integer of 2 to n) is connected in parallel to each (k−1)-th energy storage cell constituting the second series circuit to form (n−1) parallel circuits, and each 1-th energy storage cell constituting the first series circuit (wherein 1 is an integer of 1 to (n−1)) is connected in parallel to each 1-th energy storage cell constituting the third series circuit to form (n−1) parallel circuits; and, when each of a plurality of switches making up the second switch group is turned on, attain a second connection state in which each 1-th energy storage cell constituting the first series circuit is connected in parallel to each 1-th energy storage cell constituting the second series circuit to form (n−1) parallel circuits, and each k-th energy storage cell constituting the first series circuit is connected in parallel to each (k−1)-th energy storage cell constituting the third series circuit to form (n−1) parallel circuits. The voltage equalization circuit is operable to switch between the first and second connection states to thereby equalize voltages of the energy storage cells making up the first to third series circuits. Particularly, in the voltage equalization circuit of the present invention, the first switch group is made up by positioning field-effect transistors as switches in each of the parallel circuits formed in the first connection state, and arranged such that the each of the parallel circuits formed in the first connection state includes a field-effect transistor adapted to avoid blocking a current having one of opposite polarities in the each of the parallel circuits, and a field-effect transistor adapted to avoid blocking a current having the other polarity in the each of the parallel circuits, and the second switch group is made up by positioning field-effect transistors as switches in each of the parallel circuits formed in the second connection state, and arranged such that the each of the parallel circuits formed in the second connection state includes a field-effect transistor adapted to avoid blocking a current having one of opposite polarities in the each of the parallel circuits, and a field-effect transistor adapted to avoid blocking a current having the other polarity in the each of the parallel circuits.

In the present invention, each switch group is constructed such that a field-effect transistor forming a parasitic diode which allows a current having one of opposite polarities to flow therethrough, and a field-effect transistor forming a parasitic diode which allows a current having the other polarity to flow therethrough, are provided in each of the parallel circuits in which energy storage cells to be subjected to mutual charging and discharging are connected in parallel. This makes it possible to, in the parallel circuit having the switches in the OFF state, bidirectionally block a current from flowing between the energy storage cells.

In a specific embodiment, the present invention allows each of the switches used in the energy storage module according to the previous patented invention to be made up of only one field-effect transistor.

As has been mentioned, a direction of current which promotes the mutual charging and discharging depends on conditions during use. Thus, in the first and second switch groups, it is necessary to bidirectionally block a current causing the mutual charging and discharging from flowing between the energy storage cells through the switch in the OFF state. In view of this, the single field-effect transistor configuration which allows, even in its OFF state, a current having one of opposite polarities to flow therethrough seems to be insufficient as a switch. However, even in cases where such a single field-effect transistor configuration is employed, the first and second switch groups may be constructed according to teaching of the present invention, so that it becomes possible to achieve the bidirectional current blocking as "group".

In the voltage equalization circuit of the present invention, as each of the switches making up the first and second switch groups, a MOSFET may be used. Alternatively, any other suitable transistor switch capable of being switched between its ON and OFF states according to control using a driving signal may be used. Specifically, it is possible to use any transistor switch including various types of field-effect transistors, a switch formed by connecting a body diode to any transistor, and a switch formed by connecting a diode between an emitter and a collector of a transistor. However, in view of suppressing voltage drop, it is preferable to use a field-effect transistor such as MOSFET.

In the voltage equalization circuit of the present invention, the first switch group may be configured by positioning MOSFETs such that, when one of the energy storage cells making up the first series circuit and one of the energy storage cells making up the second series circuit are connected in parallel in the first connection state to form an energy storage cell pair, MOSFETs thereof are located, respectively, between respective high-potential electrodes of the energy storage cell pair and between respective low-potential electrodes of the energy storage cell pair, in such a manner that a source electrode of each of the MOSFETs is connected to a side of the electrodes of the storage cell comprised in the first series circuit and a drain electrode of each of the MOSFETs is connected to a side of the electrodes of the energy storage cell comprised in the second series circuit, and, when one of the energy storage cells making up the first series circuit and one of the energy storage cells making up the third series circuit are connected in parallel in the first connection state to form an energy storage cell pair, MOSFETs thereof are located, respectively, between respective high-potential electrodes of the energy storage cell pair and between respective low-potential electrodes of the energy storage cell pair, in such a manner that a drain electrode of each of the MOSFETs is connected to a side of the electrodes of the storage cell comprised in the first series circuit and a source electrode of each of the MOSFETs is connected to a side of the electrodes of the energy storage cell comprised in the third series circuit. Further, the second switch group may be configured by positioning MOSFETs such that, when one of the energy storage cells making up the first series circuit and one of the energy storage cells making up the second series circuit are connected in parallel in the second connection state to form an energy storage cell pair, MOSFETs thereof are located, respectively, between respective high-potential electrodes of the energy storage cell pair and between respective low-potential electrodes of the energy storage cell pair, in such a manner that a drain electrode of each of the MOSFETs is connected to a side of the electrodes of the storage cell comprised in the first series circuit and a source electrode of each of the MOSFETs is connected to a side of the electrodes of the energy storage cell comprised in the second series circuit, and, when one of the energy storage cells making up the first series circuit and one of the energy storage cells making up the third series circuit are connected in parallel in the second connection state to form an energy storage cell pair, MOSFETs thereof are located, respectively, between respective high-potential electrodes of the energy storage cell pair and between respective low-potential electrodes of the energy storage cell pair, in such a manner that a source electrode of each of the MOSFETs is connected to a side of the electrodes of the storage cell comprised in the first series circuit and a drain electrode of each of the MOSFETs is connected to a side of the electrodes of the energy storage cell comprised in the third series circuit.

The MOSFETs may be arranged in the above manner to specifically configure the first and second switch groups to be comprised in the voltage equalization circuit of the present invention. However, the present invention is not limited to the above configuration of the first and second switch groups, but the first and second switch groups may be configured in any other suitable manner capable of bidirectionally blocking a current causing the mutual charging and discharging from flowing between the energy storage cells through the switch in the OFF state.

In the present invention, a driver circuit for driving each of the switches may comprise: a coupling capacitor connected in series to a gate electrode of each of the MOSFETs making up the first and second switch groups; a resistor connected between the source electrode and the gate electrode of each of the MOSFETs; and a diode connected in parallel to the resistor to avoid blocking a current from flowing in a direction from the source electrode to the gate electrode. During operation, each of the switches is driven in such a manner that each of the MOSFETs is switched between its ON and OFF states according to control of a driving signal to be input into the gate electrode through the coupling capacitor.

As will be described in an aftermentioned embodiment, the above driver circuit may be used to drive each of the switches in such a manner that a current is input from an arbitrary driving signal output circuit into the gate electrode through the coupling capacitor, to apply a voltage between the gate electrode and the source electrode so as to turn on the MOSFET (wherein a current flowing between the gate electrode and the source electrode is rectified toward the gate electrode by the action of the diode), and then the current input into the gate electrode is stopped to release electric charges stored between the gate electrode and the source electrode during the ON state (a current flows from the gate electrode to the source electrode through the resistor to release the electric charges) so as to turn off the MOSFET. However, the present invention is not limited to the above driver circuit, but any other suitable driver circuit capable of changing a voltage between the gate electrode and the source electrode according to any driving signal to switch between ON and OFF states of the switch can be employed.

The voltage equalization circuit of the present invention may comprise a driving signal output circuit which includes a light-emitting section having a light-emitting element, and a light-receiving section provided with a light-receiving element adapted to generate an electric signal in response to light emitting of the light-emitting element and a push-pull circuit adapted to output the driving signal in response to the electric signal, and electrically isolated with respect to the light-emitting element, wherein the driving signal output circuit is connected to each of the coupling capacitors, and adapted to control the driving signal to be input into the gate electrode through the coupling capacitor, to thereby switch between ON and OFF states of each of the MOSFETs.

In the above voltage equalization circuit, a light-emitting diode and a photodiode may be used, respectively, as the light--emitting element and the light-receiving element, and the push-pull circuit may be constructed by connecting an NPN-type transistor and a PNP-type transistor. It is understood that any other type of element or circuit having the same function may also be used. In this case, a voltage is externally applied to the light-emitting diode to cause the light-emitting diode to emit light, so that a current signal generated from the photodiode in response to receiving the light flows between a base and an emitter of the NPN-type transistor, and a driving signal current is supplied from a power supply of the push-pull circuit to the coupling capacitor through a collector and the emitter of the NPN-type transistor. Thus, based on the driving signal current, a voltage is applied between the gate electrode and the source electrode of the MOSFET so as to turn on the MOSFET. On the other hand, when the voltage application to the light-emitting diode is stopped, the output of the driving signal current, i.e., the current input into the gate electrode, in the above process, is stopped, so that a current flows from the gate electrode to the source electrode to release electric charges stored between the gate and source electrodes so as to turn off the MOSFET, as mentioned above. The current from the gate electrode flows between an emitter and a base of the PNP-type transistor through the coupling capacitor. Consequently, the current from the gate electrode also flows between the emitter and a collector of the PNP-type transistor, so that it will flow into a reference potential point of the push-pull circuit.

However, the above driving signal output circuit using the light-emitting diode and others is just one example. The voltage equalization circuit of the present invention may be operated using any other suitable driving signal output circuit capable of outputting a driving signal for driving a MOSFET.

In the operation of the voltage equalization circuit of the present invention, as the driving signal output circuit, it is possible to use: a first driving signal output circuit connected to all of the coupling capacitors connected in series to respective ones of the gate electrodes of the MOSFETs making up the first switch group, and adapted to output a driving signal to all of the gate electrodes of the MOSFETs making up the first switch group through respective ones of the coupling capacitors; and a second driving signal output circuit connected to all of the coupling capacitors connected in series to respective ones of the gate electrodes of the MOSFETs making up the second switch group, and adapted to output a driving signal to all of the gate electrodes of the MOSFETs making up the second switch group through respective ones of the coupling capacitors, wherein each of the first and second driving signal output circuits is adapted to control the driving signal to be input therefrom to thereby switch between the ON and OFF states of each of the MOSFETs making up a respective one of the first and second switch groups.

The voltage equalization circuit of the present invention is operable to equalize voltages of the energy storage cells based on switching between the first connection state to be attained by turning on the switches making up the first switch group, and the second connection state to be attained by turning on the switches making up the second switch group. Thus, as the driving signal output circuit, it is only necessary to prepare the following two circuits: a circuit for outputting a driving signal to all of the switches making up the first switch group; and a circuit for outputting a driving signal to all of the switches making up the second switch group. However, three or more driving signal output circuits may be used to drive the switches individually, or only one driving signal output circuit capable of outputting two types of driving signals may be used to controllably drive the first and second switch groups.

As the driving signal output circuit to be used during the operation of the voltage equalization circuit of the present invention, a circuit comprising a light-emitting section having a light-emitting element, and a light-receiving section having a light-receiving element and a push-pull circuit (typically, two circuits consisting of a circuit for supplying a driving signal to the switches making up the first switch group and a circuit for supplying a driving signal to the switches making up the second switch group) may be used, as mentioned above. In this case, the voltage equalization circuit may be configured such that the light-emitting element provided in each of the driving signal output circuits is connected to a light-emitting element driver circuit which is connected to one or more of the energy storage cells making up the first to third series circuits, so as to allow the one or more energy storage cells to be used as a power supply for operating the light-emitting driver circuit, and the push-pull circuit provided in each of the driving signal output circuits is connected to one or more of the energy storage cells making up the first to third series circuits, so as to allow the one or more energy storage cells to be used as a power supply for operating the push-pull circuit. This eliminates a need for externally supplying electric power to the driving signal output circuits, so that it becomes possible to use the voltage equalization circuit of the present invention as an uninterruptible power supply system.

The uninterruptible power supply system is often used as an emergency power supply. In this case, it is required to be continuously operated in a stable manner without failures. In this regard, in the voltage equalization circuit of the present invention, a configuration of a driver circuit for driving each of the switch groups, etc., becomes simpler than ever before, so that it becomes possible to provide an emergency power supply in which the risk of failure is reduced to a lower level than ever before.

As will be described in the aftermentioned embodiment, in cases where each of the first and second switch groups is driven using the above driving signal output circuit comprising a light-emitting section having a light-emitting element, and a light-receiving section having a light-receiving element and a push-pull circuit (particularly, a drive signal is supplied from a single driving signal output circuit to all of the switches making up either one of the first and second switch groups), along with an increase in the number of energy storage cells serially connected in the voltage equalization circuit, a higher voltage is likely to be applied to the coupling capacitor connected to the switch arranged between the energy storage cells on a high potential side. In this situation, the number of energy storage cells serially connected is likely to be restricted depending on a withstand voltage of the coupling capacitor.

This problem can be solved by modularizing the voltage equalization circuit of the present invention.

Specifically, the present invention provides a voltage equalization circuit which is constructed by: connecting in series N modules each provided as the above voltage equalization circuit (configured to be controllably operated using the aforementioned driving signal output circuit) in which the number n is defined as $n_i$, wherein i is an integer of 1 to N (N being an integer of 2 or more) (each of the N modules will hereinafter be referred to as "the i-th module"): and connecting an energy storage cell to each position between the second series circuits and between the third series circuits in directly-connected two of the N modules, wherein a reference potential point of the push-pull circuit comprised in the driving signal output circuit for switching between the ON and OFF states of each of the MOSFETs comprised in the i-th module is connected to one of the energy storage cells comprised in the i-th module. This means that all of the coupling capacitors comprised in a specific one of the N modules are connected between two of the energy storage cells in the specific module. Thus, based on appropriately selecting a value of the number of energy storage cells serially connected in each of the N modules, it becomes possible to selectively set the number of energy storage cells serially connected within the entire voltage equalization circuit, to any value, while avoiding imposing a high load on the coupling capacitors.

The present invention also provides a voltage equalization circuit constructed by: alternately connecting, in parallel, (i) m series circuits each of which is constructed by connecting n energy storage cells in series (wherein m is an integer of 1 or more, and n is an integer of 2 or more) and (ii) in or m±1 and multiple series circuits each of which is constructed by connecting (n−1) energy storage cells in series (except for cases where the total number of parallel-connected series circuits is (4L−2), wherein L is a natural number); and providing first and second switch groups. The voltage equalization circuit is configured to: when each of a plurality of switches making up the first switch group is turned on, attain a first connection state in which an individual one of the energy storage cells comprised in each of the series circuits is connected in parallel to one or more of the energy storage cells comprised in the one or more series circuits connected in parallel to the series circuit having the individual energy storage cell, to form a plurality of parallel circuits; and, when each of a plurality of switches making up the second switch group is turned on, attain a second connection state in which an individual one of the energy storage cells comprised in each of the series circuits is connected in parallel to one or more of the energy storage cells comprised in the one or more series circuits connected in parallel to the series circuit having the individual energy storage cell, to form a plurality of parallel circuits different from the parallel circuits formed in the first connection state, so as to equalize voltages of the energy storage cells making up the respective series circuits according to switching between the first and second connection states. Particularly, in the above voltage equalization circuit, the first switch group is made up by positioning field-effect transistors in each of the parallel circuits formed in the first connection state, and arranged such that the each of the parallel circuits formed in the first connection state includes a field-effect transistor adapted to avoid blocking a current having one of opposite polarities in the each of the parallel circuits, and a field-effect transistor adapted to avoid blocking a current having the other polarity in the each of the parallel circuits, and the second switch group is made up by positioning field-effect transistors in each of the parallel circuits formed in the second connection state, and arranged such that the each of the parallel circuits formed in the second connection state includes a field-effect transistor adapted to avoid blocking a current having one of opposite polarities in the each of the parallel circuits, and a field-effect transistor adapted to avoid blocking a current having the other polarity in the each of the parallel circuits.

Considering that the energy storage module according to the previous patented S invention can be constructed under a condition that the number of series circuits to be connected in parallel is any value other than 4L−2 (wherein L is a natural number), the number of series circuits in the voltage equalization circuit of the present invention can also be generalized in the above manner.

Effect of the Invention

In the present invention, even though a switch for connecting between two energy storage cells is made up using only one field-effect transistor exhibiting a parasitic diode, a plurality of the switches are arranged to block a current causing mutual charging and discharging, during their OFF state, as a whole, i.e., as "group", so that a series-parallel reconfigurable cell voltage equalization circuit can be constructed with less number of element and simpler circuit configuration than ever before. Further, the present invention provides a driver circuit for driving each of the switches, and a driving signal output circuit, each having a simpler configuration than ever before. This strengthens the above-described primacy of the present invention over conventional products.

BRIEF DESCRIPTION OF THE DRAWINGS

FIG. 5 is an explanatory diagram conceptually illustrating a pathway of a current which flows through the switch in FIG. 4 when the switch is turned on.

DESCRIPTION OF EMBODIMENTS

With reference to FIGS. 8 to 16, the present invention will now be described based on a voltage equalization circuit according to an embodiment thereof. In the following embodiments, although an n-type MOSFET is used as each switch, any field-effect transistor other than a MOSFET may also be used as long as it is capable of being switched between ON and OFF states according to a driving signal. An energy storage cell constituting each series circuit may be constructed using any energy storage element, such as a capacitor, an electric double-layer capacitor, a lithium ion capacitor or a secondary battery, singularly or in the form of an energy storage module constructed by connecting a plurality of energy storage elements. The number of energy storage cells in each series circuit may be arbitrarily selected. In the following embodiments, a capacitance ratio between energy storage cells is selected to allow a composite capacitance of parallel-connected energy storage cells making up each of a plurality of rows of parallel-connected energy storage cells to be kept constant in both of the two connection states attained by switching of switches. However, the selection of such a capacitance ratio is not essential for voltage equalization.

[First Embodiment]

(Configuration of Voltage Equalization Circuit 1)

Figure 8:
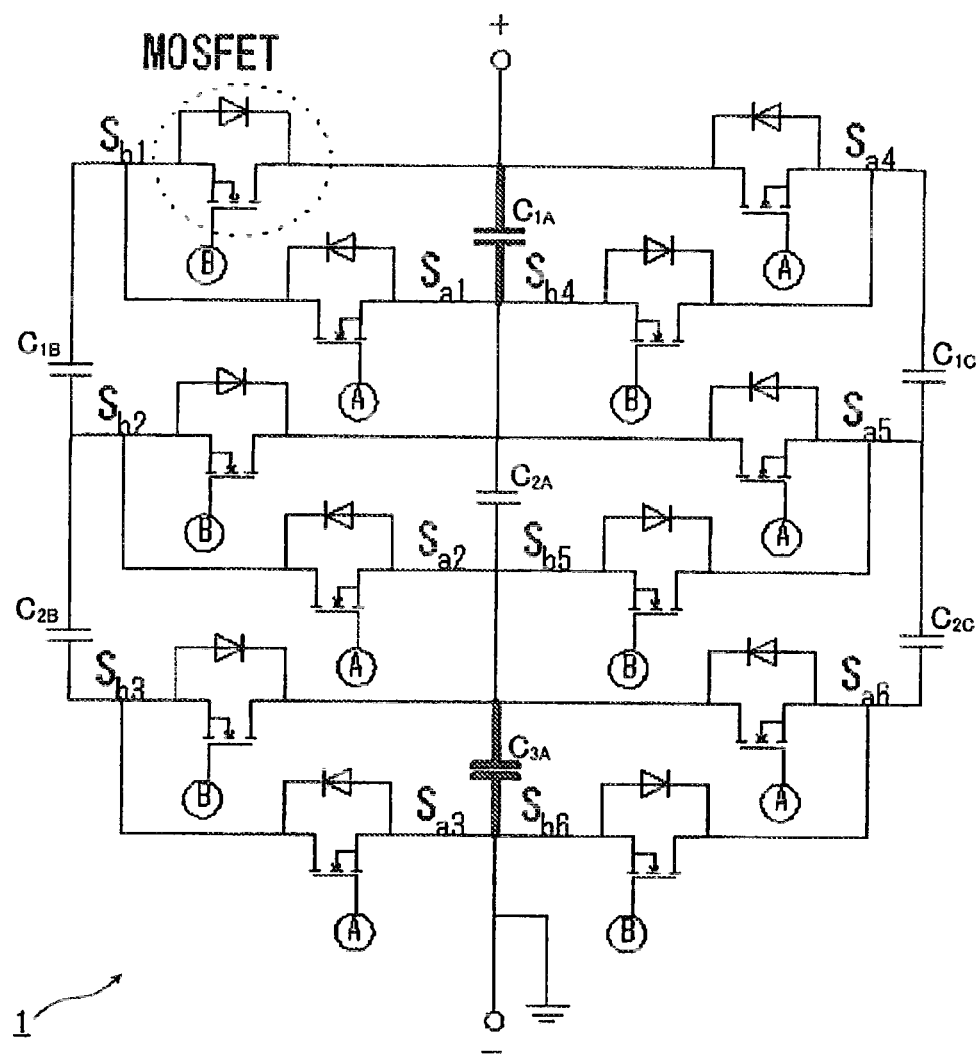
FIG. 8 is a circuit diagram of a voltage equalization circuit according to a first embodiment of the present invention, wherein a driver circuit portion connected to each switch is omitted.

FIG. 8 is a circuit diagram illustrating a voltage equalization circuit 1 according to a first embodiment of the present invention, wherein a driver circuit portion connected to each switch is omitted.

The voltage equalization circuit 1 comprises: a first series circuit constructed by connecting three energy storage cells $C_{1A}$, $C_{2A}$, $C_{3A}$ in series; a second series circuit constructed by connecting two energy storage cells $C_{1B}$, $C_{2B}$ in series; a third series circuit constructed by connecting two energy storage cells $C_{1C}$, $C_{2C}$ in series; a first switch group consisting of six switches $S_{a1}$ to $S_{a6}$ as MOSFETs; and a second switch group consisting of six switches $S_{b1}$ to $S_{b6}$ as MOSFETs. The energy storage cells are selected to allow a ratio of a capacitance of each of the energy storage cells $C_{2A}$, $C_{1B}C_{2B}$, $C_{1C}$, $C_{2C}$ to a capacitance of each of the energy storage cells $C_{1A}$, $C_{3A}$ to become 1:2.

When the energy storage cells $C_{1A}$, $C_{1A}$, $C_{3A}$ are charged in advance of a voltage equalization operation, a positive terminal and a negative terminal of an external power supply are connected, respectively, to a terminal designated by "+" and a terminal designated by "−" in FIG. 8.

Each of the switches $S_{a1}$ to $S_{a6}$, $S_{b1}$ to $S_{b6}$ is disposed between respective ones of the energy storage cells, while selecting a direction of a current which is to be permitted to flow therethrough by the action of a parasitic diode during its OFF state.

For example, the switch $S_{a1}$ is arranged between respective high-potential electrodes of the energy storage cell $C_{2A}$ and the energy storage cell $C_{1B}$, in such a manner that a source electrode and a drain electrode of the switch $S_{a1}$ are connected, respectively, to the high-potential electrode of the energy storage cell $C_{2A}$ and the high-potential electrode of the energy storage cell $C_{1B}$. The switch $S_{a2}$ is arranged between respective low-potential electrodes of the energy storage cell $C_{2A}$ and the energy storage cell $C_{1B}$, in such a manner that a source electrode and a drain electrode of the switch $S_{a2}$ are connected, respectively, to the low-potential electrode of the energy storage cell $C_{2A}$ and the low-potential electrode of the energy storage cell $C_{1B}$.

In the above arrangement of the switches $S_{a1}$, $_{Sa2}$, when each of the switches $S_{a1}$, $S_{a2}$ is in an ON state, the energy storage cells $C_{2A}$, $C_{1B}$ are connected in parallel and subjected to mutual charging and discharging. On the other hand, when each of the switches $S_{a1}$, $S_{a2}$ is in an OFF state, a current can be bidirectionally blocked from flowing between the energy storage cells $C_{2A}$, $C_{1B}$. Thus, it becomes possible to operate the voltage equalization circuit 1 in the same manner as in the case of using a bidirectional switch as each of the switches $S_{a1}$, $S_{a2}$. The remaining switches are arranged as illustrated in FIG. 8 so as to similarly control a charging and discharging current between the energy storage cells.

Figure 9:
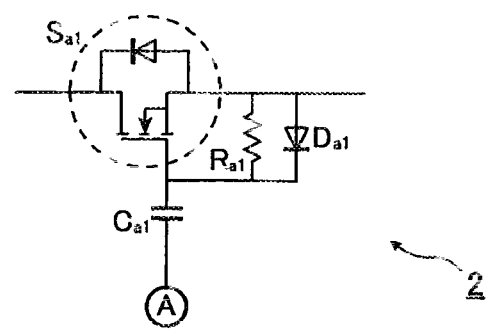
FIG. 9 is a circuit diagram illustrating a driver circuit portion connected to a switch $S_{a1}$, in the voltage equalization circuit according to the first embodiment.

A driver circuit portion is provided to each of the switches $S_{a1}$ to $S_{a6}$, $S_{b1}$ to $S_{b6}$ to drive the switch, while it is omitted in FIG. 8. As one example, a driver circuit portion 2 provided to the switch $S_{a1}$ is illustrated in FIG. 9.

The driver circuit portion 2 comprises: a coupling capacitor $C_{a1}$ connected to a gate electrode of the switch $S_{a1}$ which is a MOSFET; a resistor $R_{a1}$ connected between the source electrode and the gate electrode of the switch $S_{a1}$; a diode $D_{a1}$ connected in parallel to the resistor $R_{a1}$, in such a manner as to avoid blocking a current from flowing from the source electrode to the gate electrode of the switch $S_{a1}$.

In an operation of turning on the switch (i.e., setting the switch to an ON state), a charging current flows from an aftermentioned driving signal output circuit into the gate electrode. On the other hand, in an operation of turning off the switch (i.e., setting the switch to an OFF state), a discharging current flows out from the gate electrode to the driving signal output circuit, as described later. More specifically, a current flowing between the switch and the driving signal output circuit is an alternating current. In this case, the coupling capacitor $C_{a1}$ provided as illustrated in FIG. 9 makes it possible to allow only a driving signal to pass therethrough with respect to a different direct potential in each of the switches, so that all of the switches can be operated according to a single driving signal. One of a pair of electrodes of the coupling capacitor $C_{a1}$ is connected to the gate electrode of the switch $S_{a1}$, and the other electrode is connected to the driving signal output circuit through a terminal designated by "A" in FIG. 9.

The diode $D_{a1}$ is provided to raise a gate potential up to a source potential when the switch $S_{a1}$ is turned on. The resistor $R_{a1}$ is provided for the purpose of lowering an impedance between the source electrode and the gate electrode so as to allow the operation of turning off the switch $S_{a1}$ to be reliably performed. A driver circuit portion similar to the driver circuit portion 2 illustrated in FIG. 9 is provided to each of the remaining switches.

Figure 10:
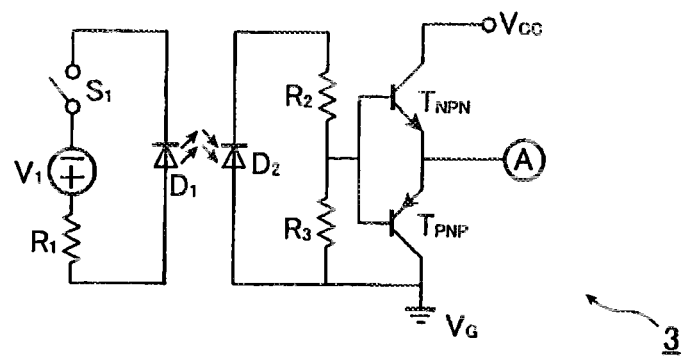
FIG. 10 is a circuit diagram illustrating a driving signal output circuit to be used during operation of the voltage equalization circuit according to the first embodiment.

FIG. 10 is a circuit diagram illustrating a driving signal output circuit 3 connected to the coupling capacitor $C_{a1}$ through the terminal "A".

The driving signal output circuit 3 comprises: a light-emitting section having a light-emitting diode $D_1$; and a light-receiving section having a photodiode $D_2$ and a push-pull circuit constructed by connecting an NPN-type transistor $T_{NPN}$ and a PNP-type transistor $T_{PNP}$. The light-emitting section and the light-receiving section are electrically isolated from each other to form a photo coupler.

During operation, in response to a voltage applied from an arbitrary light-emitting element driver circuit (although FIG. 10 illustrates a light-emitting element driver circuit comprising a light-emitting element driving power supply $V_1$, a switch $S_1$ and an optional resistor $R_1$, any other suitable circuit capable of applying a voltage to the light-emitting diode $D_1$ while performing on/off switching may be used), the light-emitting diode $D_1$ emits light, and the photodiode $D_2$ receiving the light generates a current signal. Then, according to the current signal, a driving signal current is output from the push-pull circuit.

In driving signal output circuit illustrated in FIG. 10, any one or more of the energy storage cells in the voltage equalization circuit 1 may be used as the light-emitting element driving power supply $V_1$. Specifically, a light-emitting element driver circuit may be connected to opposite terminals of any one or any array of the energy storage cells in the voltage equalization circuit 1, in place of the light-emitting element driving power supply $V_1$, and a driver circuit (not illustrated) for the switch $S_1$ may also be connected to opposite terminals of any one or any array of the energy storage cells in the voltage equalization circuit 1. In this case, the light-emitting section can be operated without externally receiving a supply of electric power.

Similarly, a power supply terminal of the push-pull circuit may be connected to any one or more of the energy storage cells in the voltage equalization circuit 1 to allow any one or more of the energy storage cells in the voltage equalization circuit 1 to be additionally used as a power supply Vcc of the push-pull circuit. In this case, the light-receiving section can be operated without externally receiving a supply of electric power.

In the above manner, the driving signal output circuit 3 may be operated by energy stored in the voltage equalization circuit 1. This makes it possible to operate the driving signal output circuit 3 without externally receiving any supply of electric power. All of a plurality of driving signal output circuits for use in operating the voltage equalization circuit 1 may also be configured to use any one or more of the energy storage cells in the voltage equalization circuit 1 as a power supply. This makes it possible to use the voltage equalization circuit 1 as uninterruptible power supply.

Figure 1:
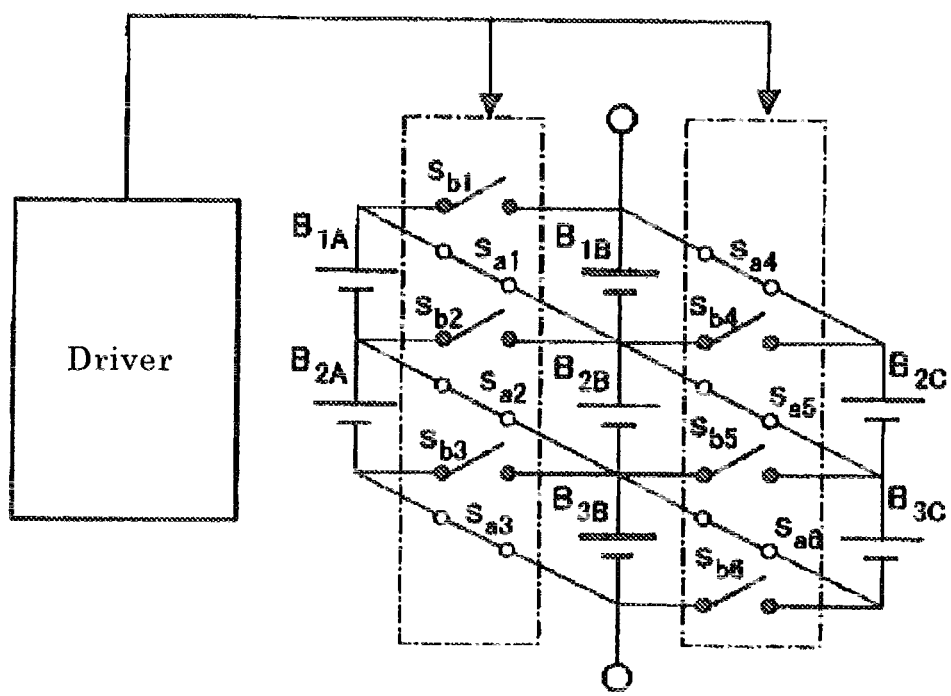
FIG. 1 is a circuit diagram illustrating one example of an energy storage module according to the previous patented invention.
Figure 2:
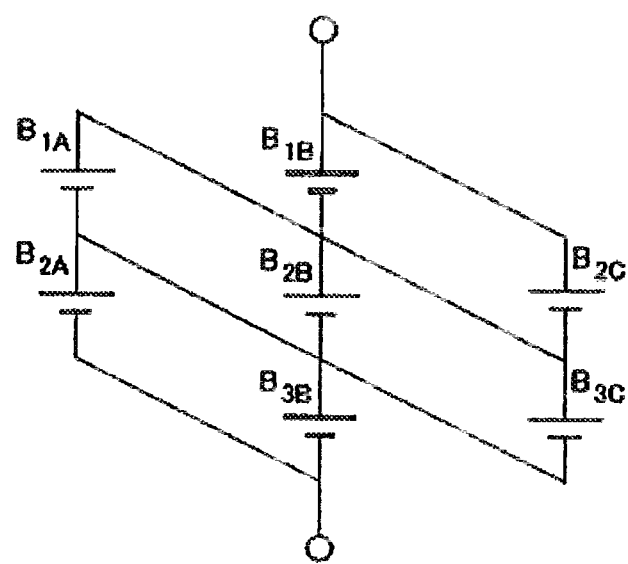
FIG. 2 is a circuit diagram illustrating a first connection state which is to be attained during operation of the energy storage module according to the previous patented invention.
Figure 3:
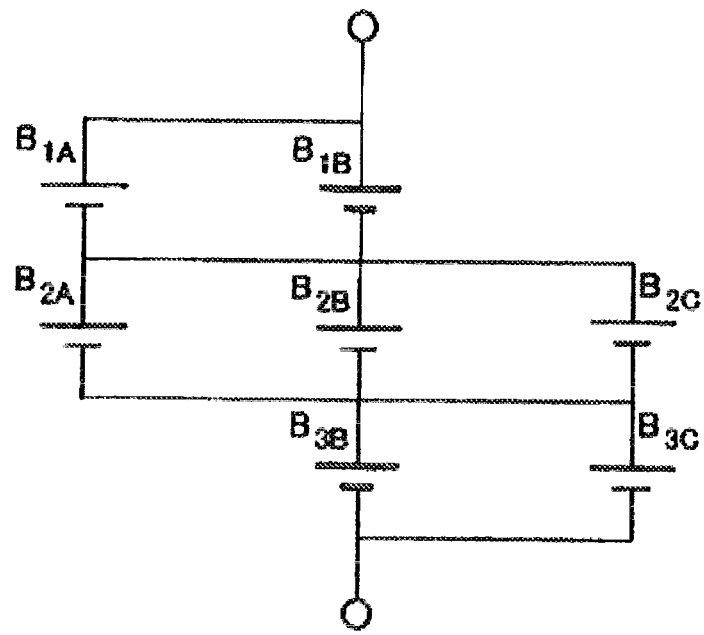
FIG. 3 is a circuit diagram illustrating a second connection state which is to be attained during operation of the energy storage module according to the previous patented invention.
Figure 4:
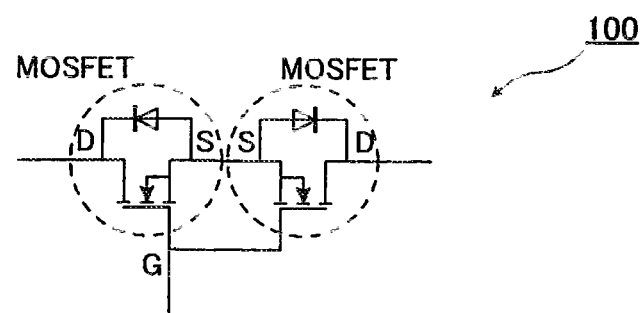
FIG. 4 is a schematic diagram illustrating a conventional bidirectional switch made up of two MOSFETs.
Figure 5:
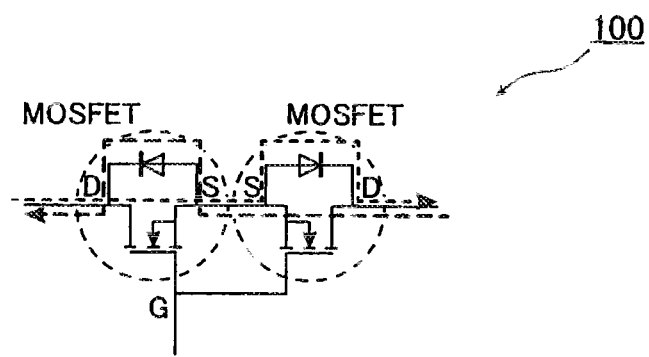
Figure 6:
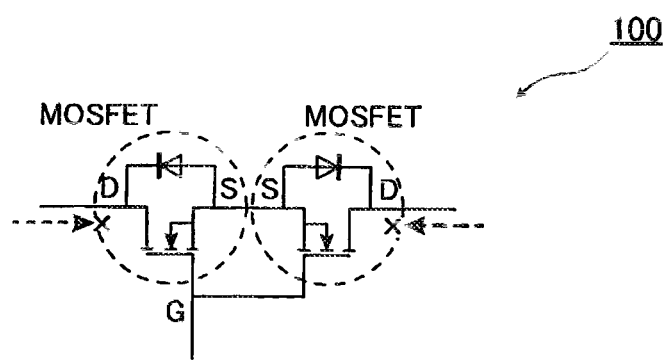
FIG. 6 is an explanatory diagram conceptually illustrating that a current is blocked from flowing through the switch in FIG. 4, when the switch is turned off.
Figure 7:
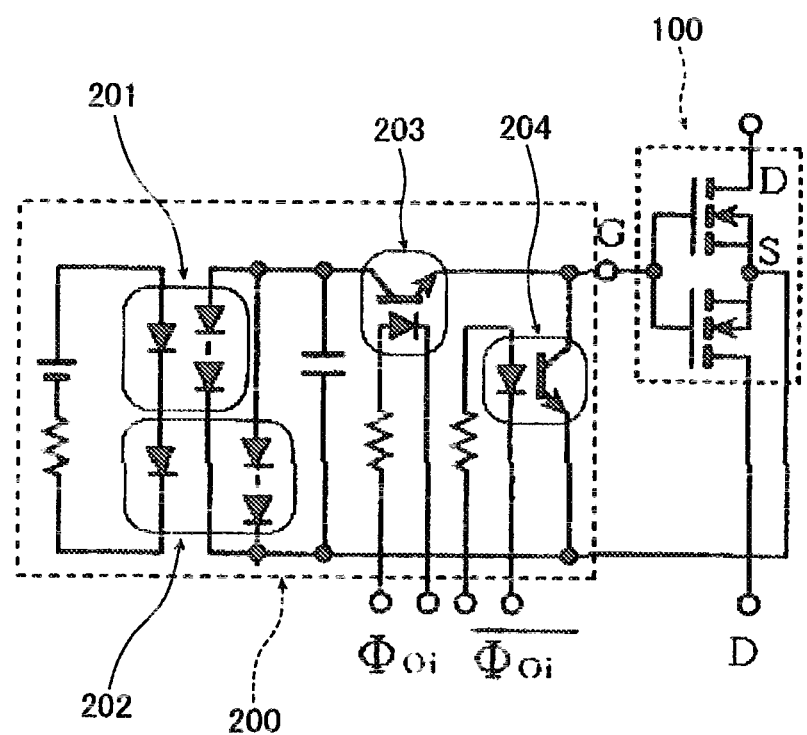
FIG. 7 is a schematic diagram illustrating a circuit configuration formed when a conventional driver circuit is connected to the switch in FIG. 4.

In the voltage equalization circuit 1 illustrated in FIG. 1, a similar driving signal output circuit is connected to each of the remaining switches other than the switch $S_{a1}$ through a corresponding coupling capacitor. As one specific embodiment, all of the switches $S_{a1}$ to $S_{a6}$ making up the first switch group may be connected to one driving signal output circuit, and all of the switches $S_{b1}$ to $S_{b6}$ making up the second switch group may be connected to another driving signal output circuit. This makes it possible to collectively drive all of the switches making up each of the first and second switch groups.

(Operation of Voltage Equalization Circuit 1)

An operation of equalizing voltages of the energy storage cells according to the voltage equalization circuit 1 will be described below. For simplification of explanation, the following description will be made on an assumption that all of the switches making up the first switch group are connected to a first driving signal output circuit having a configuration illustrated in FIG. 10, and all of the switches making up the second switch group are connected to a second driving signal output circuit having the similar configuration.

At a time of start of the equalization operation, energy stored in each of the energy storage cells may be at any level. As one example, in a state after all of the energy storage cells are fully discharged, the equalization circuit is started from a state in which the energy storage cells $C_{1A}$, $C_{2A}$, $C_{3A}$ are preliminarily charged by an external power supply (not illustrated) connected between the terminal "+" and the terminal "−" in the voltage equalization circuit 1 illustrated in FIG. 8 (the external power supply may be disconnected after completion of the charging).

The equalization operation is performed in response to repeatedly switching between the presence and absence of voltage application to the light-emitting diode, by the light-emitting element driver circuit, in each of the first and second driving signal output circuits. Typically, the above switchings in the first and second driving signal output circuits are synchronously performed in such a manner that, during a period where a voltage is applied to the light-emitting diode in the first driving signal output circuit, no voltage is applied to the light-emitting diode in the second driving signal output circuit, whereas, during a period where a voltage is applied to the light-emitting diode in the second driving signal output circuit, no voltage is applied to the light-emitting diode in the first driving signal output circuit.

If the synchronization between the switches in the first and second driving signal output circuits is not perfect, an abnormal state in which all of the switches belonging to the first and second switch groups are in the ON state or in the OFF state will intermittently occur in the voltage equalization circuit 1. However, assuming that, in this embodiment, a period of such state is fairly short, an influence of the state on the equalization operation is ignored.

Figure 11:
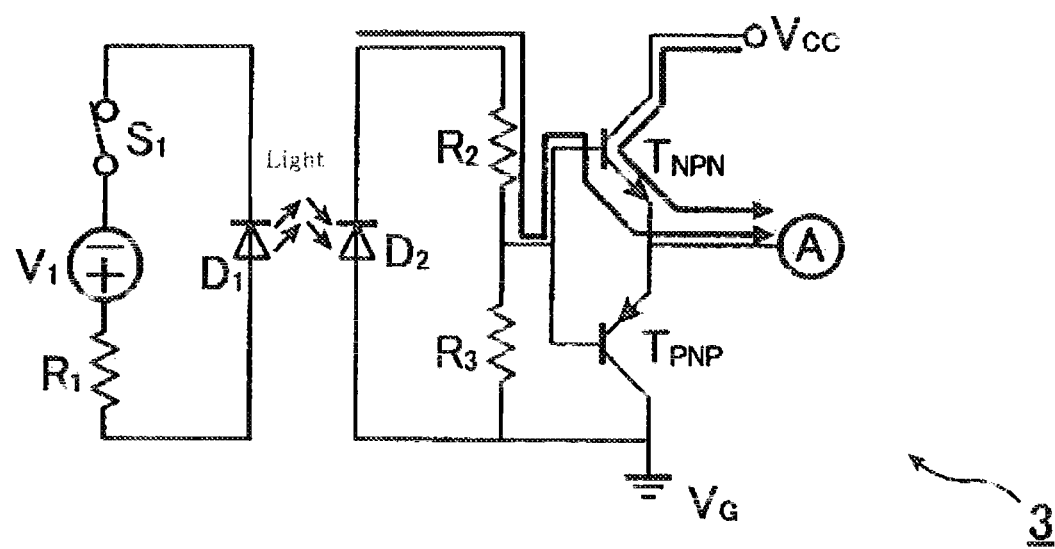
FIG. 11 is an explanatory diagram illustrating a current flow generated in a light-receiving section when a voltage is applied to a light-emitting diode in the driving signal output circuit illustrated in FIG. 10.

FIG. 11 illustrates a current flow generated in the light-receiving section of the driving signal output circuit 3 for outputting a drive signal to the switches $S_{a1}$ to $S_{a6}$ making up the first switch group, when the switch $S_1$ is turned on and thereby a voltage is applied to the light-emitting diode $D_1$. The light-emitting diode $D_1$ emits light in response to a voltage applied thereto, and a current signal generated from the photodiode $D_2$ in response to receiving the light flows between a base and an emitter of the transistor $T_{NPN}$. This allows a current to flow between a collector and the emitter of the transistor $T_{NPN}$, so that a driving signal current is input from a power supply Vcc (which may be any external power supply: alternatively, one or more of the energy storage cells in the voltage equalization circuit 1 may be used as the power supply Vcc, as mentioned above) to the switches $S_{a1}$ to $S_{a6}$ through the terminal "A" and respective ones of the coupling capacitors connected to the switches $S_{a1}$ to $S_{a6}$.

Based on inputting the driving signal current into the switches $S_{a1}$ to $S_{a6}$, a voltage is applied between the gate electrode and the source electrode, so that each of the switches $S_{a1}$ to $S_{a6}$ is turned on (first connection state). In the first connection state, each of the energy storage cell pairs: $C_{2A}$ and $C_{1B}$; $C_{3A}$ and $C_{2B}$; $C_{1A}$ and $C_{1C}$; and $C_{2A}$ and $C_{2C}$, are connected in parallel, so that a variation between respective ones of voltages of the energy storage cells will move toward being eliminated according to mutual charging, and discharging.

After an elapse of a given period (typically, a period preliminarily set in a driver circuit for the switch $S_1$), the switch $S_1$ is turned off, and thereby the voltage application to the light-emitting diode $D_1$ is stopped. In this process, a current flows from the gate electrode to the source electrode in each of the switches $S_{a1}$ to $S_{a6}$ to release electric charges between the gate and source electrodes, so that the switches $S_{a1}$ to $S_{a6}$ are turned off. The discharging current from each of the gate electrodes also flows into the driving signal output circuit 3 through a respective one of the coupling capacitors.

Figure 12:
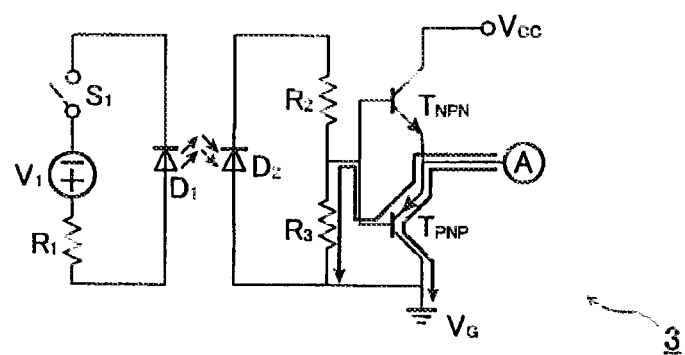
FIG. 12 is an explanatory diagram illustrating a current flow generated in the light-receiving section when no voltage is applied to the light-emitting diode in the driving signal output circuit illustrated in FIG. 10.

FIG. 12 illustrates a current flow in the above process. As illustrated in FIG. 12, the discharging current from each of the gate electrodes flows between an emitter and a base of the transistor $T_{PNP}$. This allows a current to flow between the emitter and a collector of the transistor $T_{PNP}$, so that the discharging current flows from each of the gate electrodes to a reference potential point $V_G$ through the terminal "A". The reference potential point $V_G$ may be set by grounding to the outside, or may be set by connection to any of the energy storage cells in the voltage equalization circuit, as with the power supply Vcc (wherein it is necessary that the reference potential point $V_G$ is provided on a lower potential side with respect to a position where the power supply Vcc is connected).

During a period where the switches $S_{a1}$ to $S_{a6}$ are in the OFF state, both of the mutual charging and discharging which have been performed during the ON state are stopped. Specifically, for example, between the energy storage cells $C_{2A}$, $C_{1B}$, a current flowing in a direction from the energy storage cell $C_{2A}$ to the energy storage cell $C_{1B}$ is blocked by the action of a parasitic diode formed in the switch $S_{a2}$ which is in the OFF state, and a current flowing in a direction from the energy storage cell $C_{1B}$ to the energy storage cell $C_{2A}$ is blocked by the action of a parasitic diode formed in the switch $S_{a1}$ which is in the OFF state. In the same manner, a current flowing between each of the energy storage cell pairs which have undergone the mutual charging and discharging in the first connection state is bidirectionally blocked by parasitic diodes formed in corresponding ones of the switches $S_{a1}$ to $S_{a6}$.

On the other hand, in this period, a voltage is applied to the light-emitting diode in the driving signal output circuit for outputting a drive signal to the switches $S_{b1}$ to $S_{b6}$ making up the second switch group, so that the switches $S_{b1}$ to $S_{b6}$ are turned on (the second connection state is attained) through the similar process as mentioned above. Consequently, each of the energy storage cell pairs: $C_{1A}$ and $C_{1B}$; $C_{2A}$ and $C_{2B}$; $C_{2A}$ and $C_{1C}$; and $C_{3A}$ and $C_{2C}$, are connected in parallel, so that a variation between respective ones of voltages of the energy storage cells will move toward being eliminated according to mutual charging and discharging.

Based on repeatedly performing switching between the first and second connection states, each of the energy storage cells is subjected to mutual charging and discharging with respect to all of the remaining energy storage cells other than itself, directly or indirectly (through other energy storage cells), so that a variation between respective ones of the voltages of the energy storage cells will move toward being eliminated.

[Second Embodiment]

Figure 13:
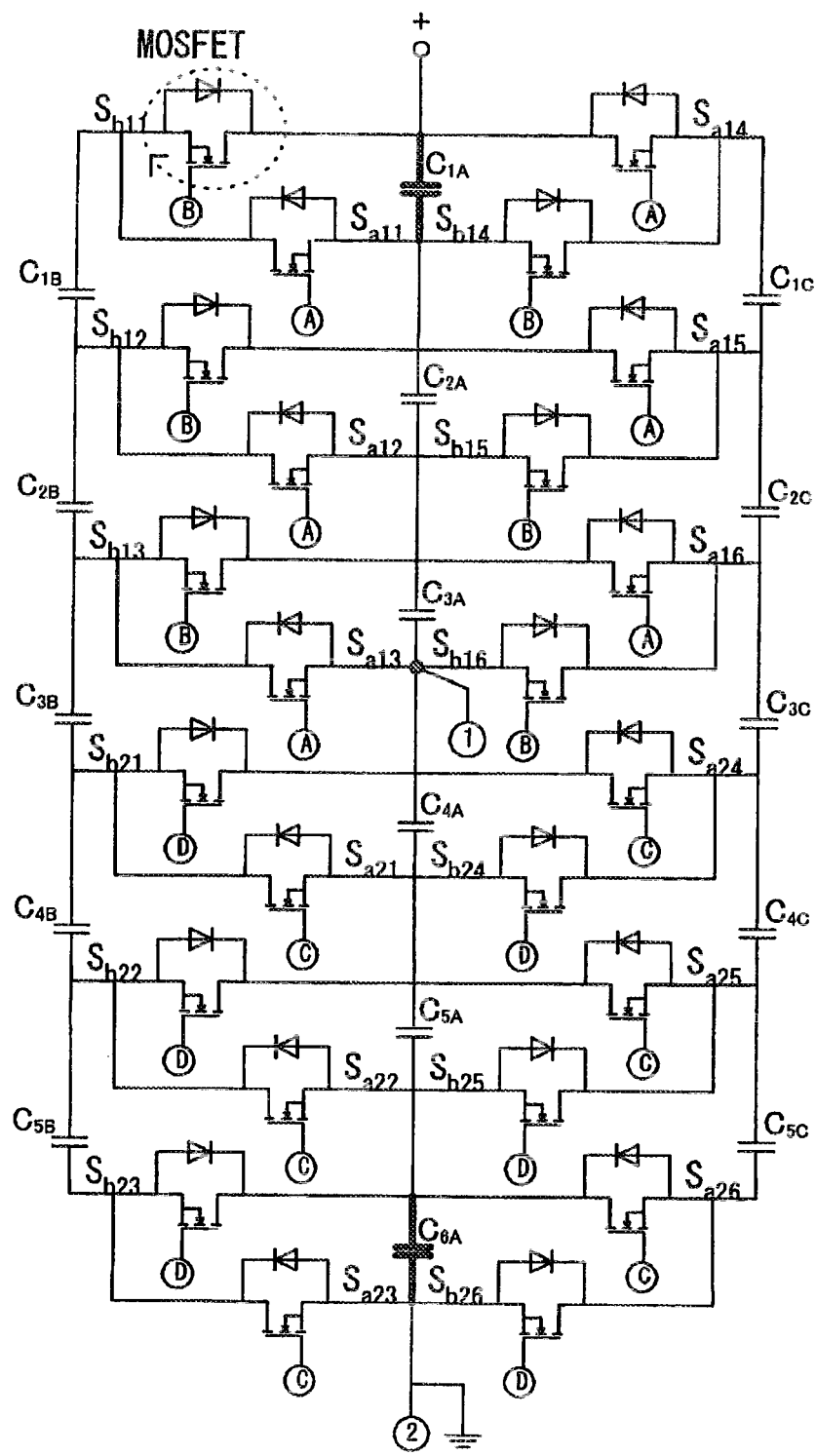
FIG. 13 is a circuit diagram of a voltage equalization circuit according to a second embodiment of the present invention, wherein a driver circuit portion connected to each switch is omitted.
Figure 14:
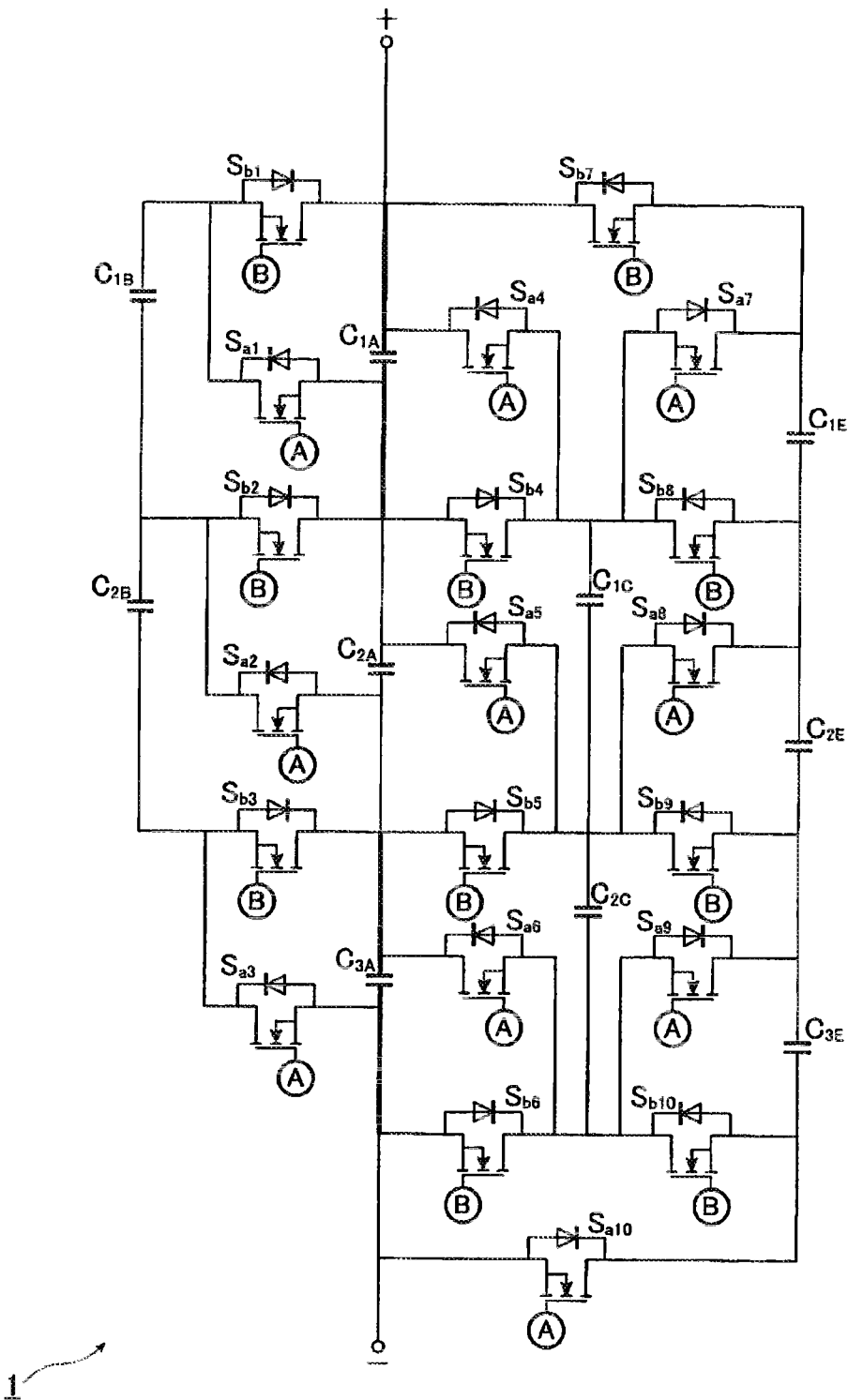
FIG. 14 is a circuit diagram of a voltage equalization circuit according to a third embodiment of the present invention, wherein a driver circuit portion connected to each switch is omitted.

FIG. 13 is a circuit diagram of a voltage equalization circuit 1 according to a second embodiment of the present invention, wherein a driver circuit portion connected to each switch is omitted.

The circuit illustrated in FIG. 13 is provided as a configuration in which the number of energy storage cells serially connected in the first series circuit within the voltage equalization circuit 1 illustrated in FIG. 8 is increased to 6. The number of energy storage cells serially connected in the first series circuit may be set to any value. Even if a value of the number of energy storage cells serially connected in the first series circuit is changed, the voltage equalization circuit of the present invention can be operated on the same principle. The energy storage cells are selected such that a ratio of a capacitance of each of the energy storage cells $C_{1A}$, $C_{6A}$ to a capacitance of each of the remaining energy storage cells is set to 2:1.

The number of energy storage cells serially connected in the first series circuit may be selectively set to any value, as mentioned above. However, along with an increase in the number of energy storage cells serially connected in the first series circuit, a higher voltage is likely to be applied to the coupling capacitor connected to the switch arranged on a high potential side. Thus, the number of energy storage cells serially connected in the first series circuit is likely to be restricted depending on a withstand voltage of the coupling capacitor.

As one example, if all of the switches making up the first switch group are connected to a single driving signal output circuit having the configuration illustrated in FIG. 10, and a reference potential point $V_G$ of the driving signal output circuit is connected to the low-potential electrode of a lowest potential-side one of the energy storage cells in the first series circuit (the energy storage cell $C_{3A}$ in the configuration illustrated in FIG. 8; the energy storage cell $C_{6A}$ in the configuration illustrated in FIG. 13), a voltage approximately equal to a total voltage of all of the energy storage cells making up the first series circuit is likely to be applied to the coupling capacitor connected to the gate electrode of the switch connected to the high-potential electrode of the energy storage cell $C_{1A}$ which is a highest potential-side one of the energy storage cells in the first series circuit (the switches $S_{b1}$, $S_{a4}$ in the configuration illustrated in FIG. 8; the switches $S_{b11}$, $S_{a14}$ in the configuration illustrated in FIG. 13). Thus, if the number of energy storage cells serially connected in the first series circuit is continuously increased in the above configuration, a high voltage greater than a withstand voltage of the coupling capacitor will be eventually applied to the coupling capacitor. Thus, the number of energy storage cells serially connected in the first series circuit is restricted depending on the withstand voltage of the coupling capacitor.

This problem can be solved by modularizing the voltage equalization circuit as described below.

Specifically, as illustrated in FIG. 13, the voltage equalization circuit 1 according to the present invention is constructed by connecting in series a first module which comprises three series-connected energy storage cells $C_{1A}$, $C_{2A}$, $C_{3A}$, two series-connected energy storage cells $C_{1B}$, $C_{2B}$, two series-connected energy storage cells $C_{1C}$, $C_{2C}$, six switches $S_{a11}$ to $S_{a16}$, and six switches $S_{b11}$, $S_{b16}$, and a second module comprising three series-connected energy storage cells $C_{4A}$, $C_{5A}$, $C_{6A}$, two series-connected energy storage cells $C_{4B}$, $C_{5B}$, two series-connected energy storage cells $C_{4C}$, $C_{5C}$, six switches $S_{a21}$ to $S_{a26}$, and six switches $S_{b21}$, $S_{b26}$, and connecting two energy storage cells $C_{3B}$, $C_{3C}$ between the first and second modules at respective positions as illustrated in FIG. 13. Further, a reference potential point of a driving signal output circuit for switching between ON and OFF states of each of the switches comprised in the first module is connected to one of the energy storage cells in the first module (for example, it may be connected to a low-potential electrode of a lowest potential-side one of the energy storage cells in the first module, as indicated by "1" in FIG. 13), and a reference potential point of a driving signal output circuit (which is different from the driving signal output circuit used in the first module) for switching between ON and OFF states of each of the switches comprised in the second module is connected to one of the energy storage cells in the second module (for example, it may be connected to a position as indicated by "2" in FIG. 13). In this case, a voltage to be applied to each coupling capacitor comprised in the first and second modules is suppressed approximately to a total voltage of the energy storage cells comprised in each of the first and second modules (the energy storage cells $C_{1A}$, $C_{2A}$, $C_{3A}$ in the first module; the energy storage cells $C_{4A}$, $C_{5A}$, $C_{6A}$ in the second module) among the entire energy storage cells making up a first series circuit of the voltage equalization circuit, at a maximum. Thus, based on appropriately selecting a size of each of the modules depending on the withdraw voltage of the coupling capacitor, it becomes possible to avoid a restriction on the number of energy storage cells serially connected in the first series circuit within the entire voltage equalization circuit.

The number of modules to be connected in series is not limited to 2, but may be set to any value. Thus, a plurality of modules may be connected in series after appropriately selecting the number of energy storage cells serially connected in a part of the first series circuit in each of the modules depending on the withstand voltage of the coupling capacitor. This makes it possible to construct an equalization circuit having a large number of energy storage cells serially connected as a whole. The circuit constructed in the above manner is operated in the same manner as that described in the first embodiment.

[Third Embodiment]

The energy storage module according to the previous patented invention is generalized as a circuit constructed by: alternately connecting, in parallel, (i) m series circuits each of which is constructed by connecting n energy storage cells or cell groups in series (wherein n is an integer of 2 or more) and (ii) m or m±1 multiple series circuits each of which is constructed by connecting (n−1) energy storage cells or cell groups in series (except for cases where the total number of parallel-connected series circuits is (4L−2), wherein L is a natural number). In view of this, the voltage equalization circuit of the present invention can also be generalized by constructing the switches comprised in the energy storage module according to the previous patented invention, as first and second switch groups, in accordance with teaching of the present invention. Specifically, the voltage equalization circuit illustrated in FIG. 8 can be said to be an example of a voltage equalization circuit where n=3, and m=1. Other examples include a circuit (where n=3, and m=2) illustrated in FIG. 14, and a circuit (where n=3, and m=3) illustrated in FIG. 15.

The voltage equalization circuit generalized in the above manner may also be variously improved as mentioned above, for example, by modularizing it to avoid a restriction on the number of energy storage cells serially connected, or by operating the driving, signal output circuit based on electric power from one or more of the energy storage cells therein to form an uninterruptible power supply system.

In cases where the number of the parallel-connected series circuit is (4L−2), it is impossible to allow a composite capacitance of parallel-connected energy storage cells making up each of a plurality of rows of parallel-connected energy storage cells to be kept constant in both of the first and second connection states attained by switching of the switches. This will be more specifically described below.

Figure 15:
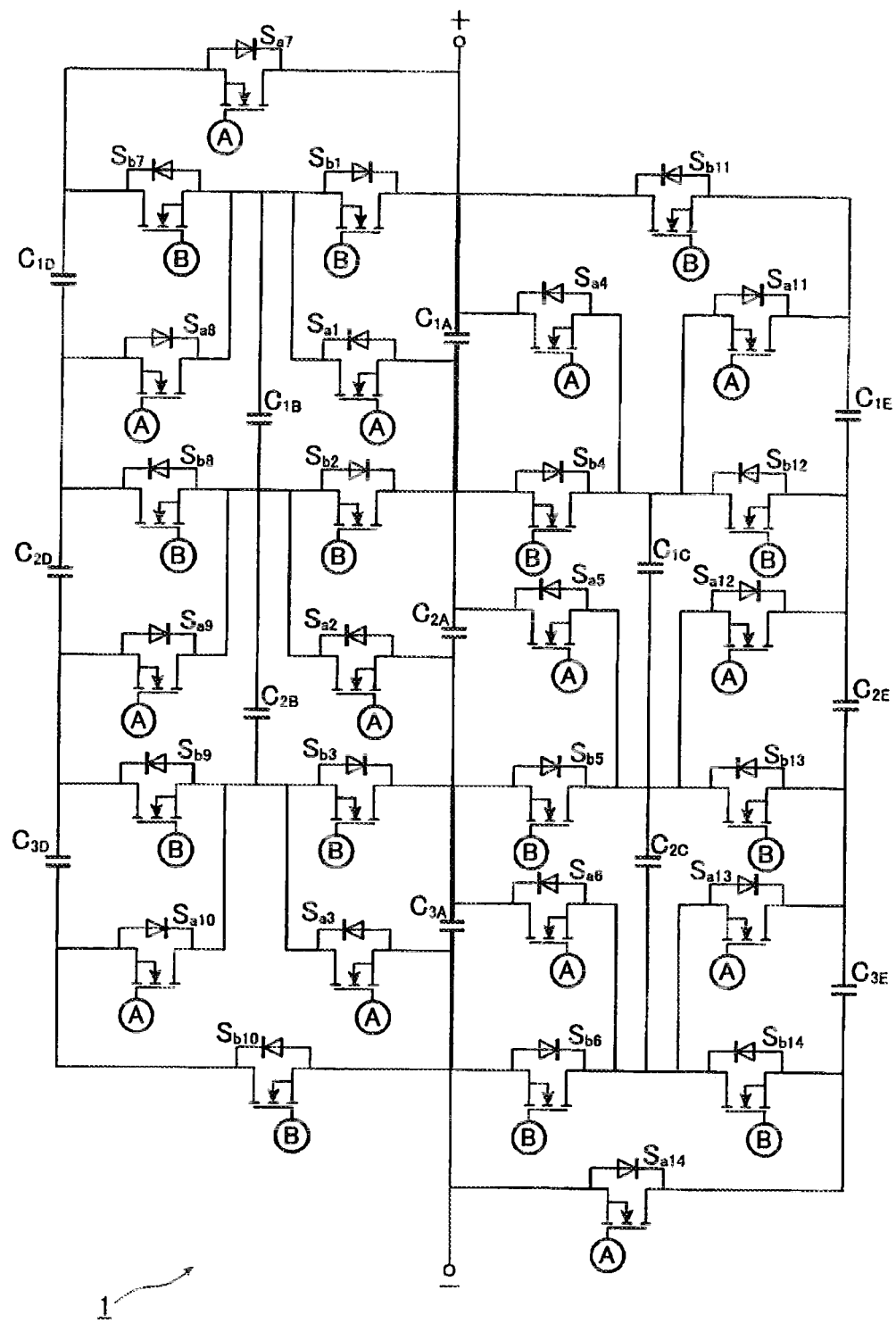
FIG. 15 is a circuit diagram illustrating one example of modification of the voltage equalization circuit according to the third embodiment, wherein a driver circuit portion connected to each switch is omitted.
Figure 16:
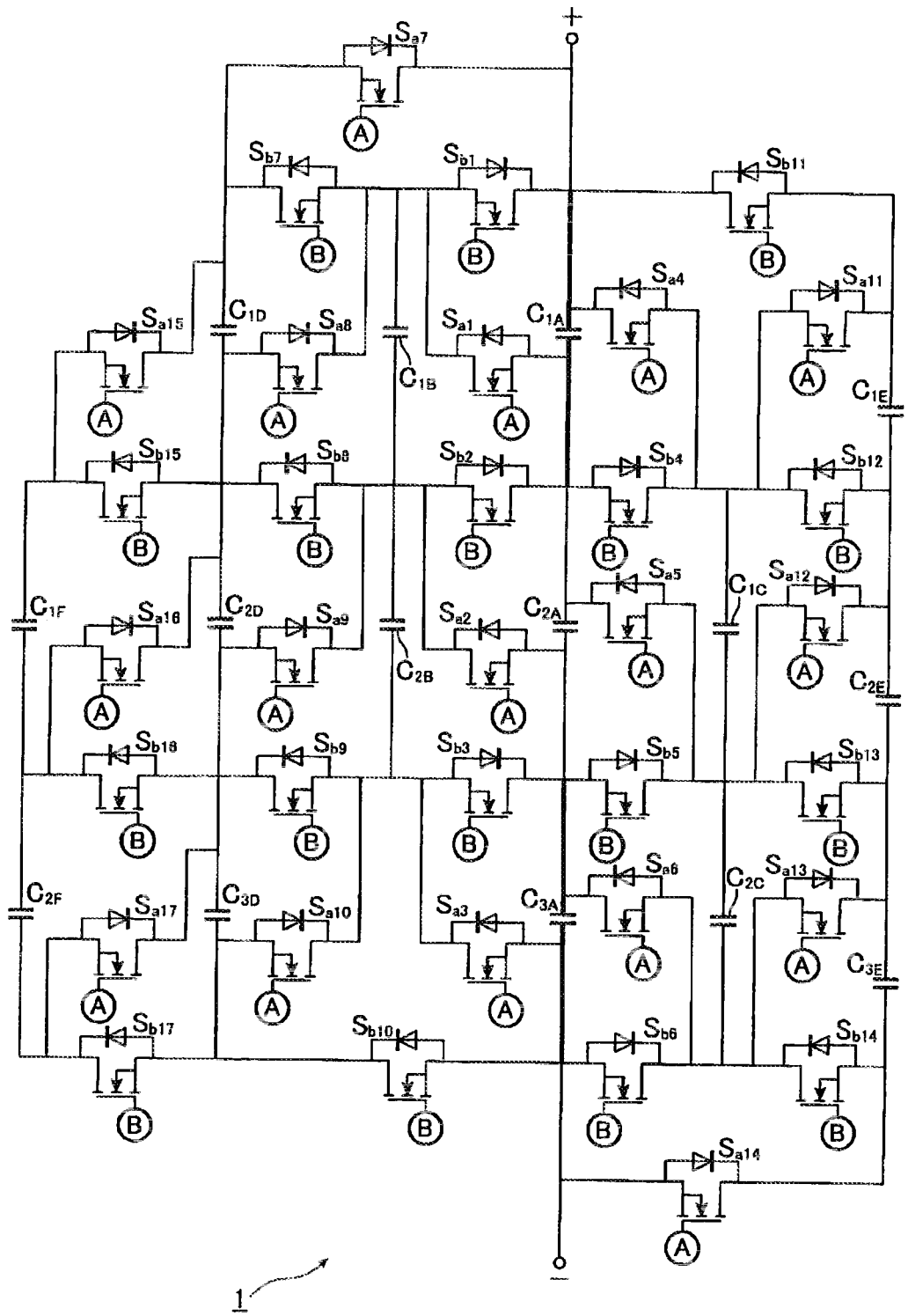
FIG. 16 is a circuit diagram illustrating another example of the modification of the voltage equalization circuit according to the third embodiment, wherein a driver circuit portion connected to each switch is omitted.

Firstly, a voltage equalization circuit where the number of parallel-connected series circuits is not (4L−2) will be described by taking the circuit illustrated in FIG. 15 as an example. When all of fourteen switches $S_{a1}$ to $S_{a14}$ are turned on, and all of fourteen switches $S_{b1}$ to $S_{b14}$ are turned off, a first connection state is attained in which a first row of parallel-connected energy storage cells $C_{1D}$, $C_{1A}$, $C_{1C}$, $C_{1E}$ (four parallel-connected energy storage cells), a second row of parallel-connected energy storage cells $C_{2D}$, $C_{1B}$, $C_{2A}$, $C_{2C}$, $C_{2E}$ (five parallel-connected energy storage cells), and a third row of parallel-connected energy storage cells $C_{3D}$, $C_{2B}$, $C_{3A}$, $C_{3E}$ (four parallel-connected energy storage cells), are connected in series. On the other hand, when all of the switches $S_{b1}$ to $S_{b14}$ are turned on, and all of the switches $S_{a1}$ to $S_{a14}$ are turned off, a second connection state is attained in which a first row of parallel-connected energy storage cells $C_{1D}$, $C_{1B}$, $C_{1A}$, $C_{1E}$ (four parallel-connected energy storage cells), a second row of parallel-connected energy storage cells $C_{2D}$, $C_{2B}$, $C_{2A}$, $C_{1C}$, $C_{2E}$ (five parallel-connected energy storage cells), and a third row of parallel-connected energy storage cells $C_{3D}$, $C_{3A}$, $C_{2C}$, $C_{3E}$ (four parallel-connected energy storage cells), are connected in series.

In this case, even if switching is performed between the first and a second connection states, the number of parallel-connected energy storage cells in each of the first to third rows is not changed. Thus, when a ratio of a capacitance of each of the energy storage cells $C_{1A}$, $C_{3A}$ to a capacitance of each of the remaining energy storage cells is set to 2:1, it becomes possible to allow a composite capacitance of parallel-connected energy storage cells making up each of the first to third rows to be kept constant in both of the first and second connection states (when a capacitance of each of the remaining energy storage cells other than the energy storage cells $C_{1A}$, $C_{3A}$ is set to C, a composite capacitance of the parallel-connected energy storage cells in each of the first to third rows is 5C).

A voltage equalization circuit where the number of parallel-connected series circuits is (4L−2), will be described below. As one example, a voltage equalization circuit constructed by additionally connecting in parallel a series circuit consisting of two energy storage cells $C_{1F}$, $C_{2F}$ (FIG. 16) to a series circuit consisting of three energy storage cells $C_{1D}$ to $C_{3D}$ in the circuit illustrated in FIG. 15 will be described (in this example, the number of parallel-connected series circuits is 4×2−2=6).

The circuit where the number of parallel-connected series circuits is 6, is configured such that, as with the switches $S_{b1}$ to $S_{b14}$, a switch $S_{b15}$ and a switch $S_{b16}$ each composed of a MOSFET are connected, respectively, between respective high-potential electrodes of the energy storage cells $C_{2D}$, $C_{1F}$ and between respective low-potential electrodes of the energy storage cells $C_{2D}$, $C_{1F}$ (a source electrode and a drain electrode of the switch $S_{b15}$ are connected, respectively, to the high-potential electrode of the energy storage cell $C_{2D}$ and the high-potential electrode of the energy storage cell $C_{1F}$, and a source electrode and a drain electrode of the switch $S_{b16}$ are connected, respectively, to the low-potential electrode of the energy storage cell $C_{2D}$ and the low-potential electrode of the energy storage cell $C_{1F}$. The source electrode and the drain electrode of the switch $S_{b16}$ are also connected, respectively, to the high-potential electrode of the energy storage cell $C_{3D}$ and the high-potential electrode of the energy storage cell $C_{2F}$), and a switch $S_{b17}$ composed of a MOSFET is connected between respective low-potential electrodes of the energy storage cells $C_{3D}$, $C_{2F}$ (a source electrode and a drain electrode of the switch $S_{b17}$ are connected, respectively, to the low-potential electrode of the energy storage cell $C_{3D}$ and the low-potential electrode of the energy storage cell $C_{2F}$). Further, the circuit where the number of parallel-connected serial circuits is 6, is configured such that, as with the switches $S_{a1}$ to $S_{a14}$, a switch $S_{a15}$ and a switch $S_{a16}$ each composed of a MOSFET are connected, respectively, between respective high-potential electrodes of the energy storage cells $C_{1D}$, $C_{1F}$ and between respective low-potential electrodes of the energy storage cells $C_{1D}$, $C_{1F}$ (a source electrode and a drain electrode of the switch $S_{a15}$ are connected, respectively, to the high-potential electrode of the energy storage cell $C_{1F}$ and the high-potential electrode of the energy storage cell $C_{1D}$, and a source electrode and a drain electrode of the switch $S_{a16}$ are connected, respectively, to the low-potential electrode of the energy storage cell $C_{1F}$ and the low-potential electrode of the energy storage cell $C_{1D}$), and a switch $S_{a17}$ composed of a MOSFET is connected between the high-potential electrode of the energy storage cell $C_{3D}$ and the low-potential electrode of the energy storage cell $C_{2F}$ (a source electrode and a drain electrode of the switch $S_{a17}$ are connected, respectively, to the low-potential electrode of the energy storage cell $C_{2F}$ and the high-potential electrode of the energy storage cell $C_{3D}$).

In the above circuit, when all of the switches $S_{a1}$ to $S_{a17}$ are turned on, and all of the switches $S_{b1}$ to $S_{b17}$ are turned off, a first connection state is attained in which a first row of parallel-connected energy storage cells $C_{1F}$, $C_{1D}$, $C_{1A}$, $C_{1C}$, $C_{1E}$ (five parallel-connected energy storage cells), a second row of parallel-connected energy storage cells $C_{2F}$, $C_{2D}$, $C_{1B}$, $C_{2A}$, $C_{2C}$, $C_{2E}$ (six parallel-connected energy storage cells), and a third row of parallel-connected energy storage cells $C_{3D}$, $C_{2B}$, $C_{3A}$, $C_{3E}$ (four parallel-connected energy storage cells), are connected in series. On the other hand, when all of the switches $S_{b1}$ to $S_{b17}$ are turned on, and all of the switches $S_{a1}$ to $S_{a17}$ are turned off, a second connection state is attained in which a first row of parallel-connected energy storage cells $C_{1D}$, $C_{1B}$, $C_{1A}$, $C_{1E}$ (four parallel-connected energy storage cells), a second row of parallel-connected energy storage cells $C_{1F}$, $C_{2D}$, $C_{2B}$, $C_{2A}$, $C_{1C}$, $C_{2E}$ (six parallel-connected energy storage cells), and a third row of parallel-connected energy storage cells $C_{2F}$, $C_{3D}$, $C_{3A}$, $C_{2C}$, $C_{3E}$ (five parallel-connected energy storage cells), are connected in series.

As above, in response to switching between the first and second connection states, the number of parallel-connected energy storage cells in each of the first to third rows is changed between (5-6-4) and (4-6-5). Thus, for example, even if a capacitance of each of the energy storage cells $C_{1A}$, $C_{3A}$ is set to 2C, and a capacitance of each of the remaining energy storage cells is set to C, a composite capacitance of parallel-connected energy storage cells in each of the rows is not be kept constant in both of the first and second connection states.

However, even in this case, voltages of all of the energy storage cells comprised in the circuit can be equalized by repeating the switching between the first and second connection states. In other words, if the requirement "allowing a composite capacitance of parallel-connected energy storage cells in each of a plurality of rows to be kept constant" is not set up, the voltage equalization circuit of the present invention can be constructed under the condition that the number of parallel-connected series circuits is (4L−2).

In layout of a plurality of switches, it is necessary to pay attention to preventing each energy storage cell from being discharged through a switch in its OFF state. Such discharge can be avoided by configuring each switch group in such a manner that at least one field-effect transistor forming a parasitic diode capable of blocking a current which promotes the discharge is inserted in each pathway connecting a high-potential electrode and a low-potential electrode of a energy storage cell comprised in the voltage equalization circuit.

Industrial Applicability

The voltage equalization circuit of the present invention is usable as any power supply system including an emergency power supply. The present invention makes it possible to construct a power supply system with less number of element and simpler circuit configuration than ever before, and therefore provide a power supply system with lower failure risk at lower cost.

EXPLANATION OF CODES

1: voltage equalization circuit
$C_{1A}$ to $C_{6A}$: energy storage cell
$C_{1B}$ to $C_{5B}$: energy storage cell
$C_{1C}$ to $C_{5C}$: energy storage cell
$C_{1D}$ to $C_{3D}$: energy storage cell
$C_{1E}$ to $C_{3E}$: energy storage cell
$C_{1F}$ to $C_{2F}$: energy storage cell
$S_{a1}$ to $S_{a17}$: switch
$S_{a11}$ to $S_{a16}$: switch
$S_{a21}$ to $S_{a26}$: switch
$S_{b1}$ to $S_{b17}$: switch
$S_{b11}$ to $S_{b16}$: switch
$S_{b21}$ to $S_{b26}$: switch
2: driver circuit portion
$C_{a1}$: coupling capacitor
$R_{a1}$: resistor
$D_{a1}$: diode
3: driving signal output circuit
Vcc: power supply
$V_G$: reference potential point
$T_{NPN}$: NPN-type transistor
$T_{PNP}$: PNP-type transistor
$R_1$ to $R_3$: resistor
$D_1$: light-emitting diode
$D_2$: photodiode
$S_1$: switch
$V_1$: light-emitting element driving power supply

The invention claimed is:

1. A voltage equalization circuit comprising: a first series circuit constructed by connecting n energy storage cells in series (wherein n is an integer of 2 or more); second and third series circuits each constructed by connecting (n−1) energy storage cells in series; and first and second switch groups, wherein the voltage equalization circuit is configured to:
when each of a plurality of switches making up the first switch group is turned on, attain a first connection state in which each k-th energy storage cell constituting the first series circuit (wherein k is an integer of 2 to n) is connected in parallel to each (k−1)-th energy storage cell constituting the second series circuit to form (n−1) parallel circuits, and each 1-th energy storage cell constituting the first series circuit (wherein l is an integer of 1 to (n−1)) is connected in parallel to each 1-th energy storage cell constituting the third series circuit to form (n−1) parallel circuits; and,
when each of a plurality of switches making up the second switch group is turned on, attain a second connection state in which each 1-th energy storage cell constituting the first series circuit is connected in parallel to each 1-th energy storage cell constituting the second series circuit to form (n−1) parallel circuits, and each k-th energy storage cell constituting the first series circuit is connected in parallel to each (k−1)-th energy storage cell constituting the third series circuit to form (n−1) parallel circuits, the voltage equalization circuit being operable to switch between the first and second connection states to thereby equalize voltages of the energy storage cells making up the first to third series circuits, and wherein:
the first switch group is made up by positioning field-effect transistors as switches in each of the parallel circuits formed in the first connection state, and arranged such that the each of the parallel circuits formed in the first connection state includes a field-effect transistor adapted to avoid blocking a current having one of opposite polarities in the each of the parallel circuits, and a field-effect transistor adapted to avoid blocking a current having the other polarity in the each of the parallel circuits; and
the second switch group is made up by positioning field-effect transistors as switches in each of the parallel circuits formed in the second connection state, and arranged such that the each of the parallel circuits formed in the second connection state includes a field-effect transistor adapted to avoid blocking a current having one of opposite polarities in the each of the parallel circuits, and a field-effect transistor adapted to avoid blocking a current having the other polarity in the each of the parallel circuits.

2. The voltage equalization circuit as defined in claim 1, wherein each of the switches making up the first and second switch groups is a metal-oxide semiconductor field-effect transistor (MOSFET).

3. The voltage equalization circuit as defined in claim 2, wherein:
the first switch group is configured by positioning MOSFETs such that, when one of the energy storage cells making up the first series circuit and one of the energy storage cells making up the second series circuit are connected in parallel in the first connection state to form an energy storage cell pair, MOSFETs thereof are located, respectively, between respective high-potential electrodes of the energy storage cell pair and between respective low-potential electrodes of the energy storage cell pair, in such a manner that a source electrode of each of the MOSFETs is connected to a side of the electrodes of the storage cell comprised in the first series circuit and a drain electrode of each of the MOSFETs is connected to a side of the electrodes of the energy storage cell comprised in the second series circuit, and, when one of the energy storage cells making up the first series circuit and one of the energy storage cells making up the third series circuit are connected in parallel in the first connection state to form an energy storage cell pair, MOSFETs thereof are located, respectively, between respective high-potential electrodes of the energy storage cell pair and between respective low-potential electrodes of the energy storage cell pair, in such a manner that a drain electrode of each of the MOSFETs is connected to a side of the electrodes of the storage cell comprised in the first series circuit and a source electrode of each of the MOSFETs is connected to a side of the electrodes of the energy storage cell comprised in the third series circuit; and the second switch group is configured by positioning MOSFETs such that, when one of the energy storage cells making up the first series circuit and one of the energy storage cells making up the second series circuit are connected in parallel in the second connection state to form an energy storage cell pair, MOSFETs thereof are located, respectively, between respective high-potential electrodes of the energy storage cell pair and between respective low-potential electrodes of the energy storage cell pair, in such a manner that a drain electrode of each of the MOSFETs is connected to a side of the electrodes of the storage cell comprised in the first series circuit and a source electrode of each of the MOSFETs is connected to a side of the electrodes of the energy storage cell comprised in the second series circuit, and, when one of the energy storage cells making up the first series circuit and one of the energy storage cells making up the third series circuit are connected in parallel in the second connection state to form an energy storage cell pair, MOSFETs thereof are located, respectively, between respective high-potential electrodes of the energy storage cell pair and between respective low-potential electrodes of the energy storage cell pair, in such a manner that a source electrode of each of the MOSFETs is connected to a side of the electrodes of the storage cell comprised in the first series circuit and a drain electrode of each of the MOSFETs is connected to a side of the electrodes of the energy storage cell comprised in the third series circuit.

4. The voltage equalization circuit as defined in claim 3, which comprises: a coupling capacitor connected in series to a gate electrode of each of the MOSFETs making up the first and second switch groups; a resistor connected between the source electrode and the gate electrode of each of the MOSFETs; and a diode connected in parallel to the resistor to avoid blocking a current from flowing in a direction from the source electrode to the gate electrode, whereby each of the MOSFETs is switchable between its ON and OFF states according to control of a driving signal to be input into the gate electrode through the coupling capacitor.

5. The voltage equalization circuit as defined in claim 4, wherein a driving signal output circuit comprising:
a light-emitting section having a light-emitting element; and
a light-receiving section provided with a light-receiving element adapted to generate an electric signal in response to light emitting of the light-emitting element and a push-pull circuit adapted to output the driving signal in response to the electric signal, and electrically isolated with respect to the light-emitting element;
is connected to each of the coupling capacitors, and the driving signal output circuit is adapted to control the driving signal to be input into the gate electrode through the coupling capacitor, to thereby switch between ON and OFF states of each of the MOSFETs.

6. The voltage equalization circuit as defined in claim 5, wherein the driving signal output circuit includes:
a first driving signal output circuit connected to all of the coupling capacitors connected in series to respective ones of the gate electrodes of the MOSFETs making up the first switch group, and adapted to output a driving signal to all of the gate electrodes of the MOSFETs making up the first switch group through respective ones of the coupling capacitors; and
a second driving signal output circuit connected to all of the coupling capacitors connected in series to respective ones of the gate electrodes of the MOSFETs making up the second switch group, and adapted to output a driving signal to all of the gate electrodes of the MOSFETs making up the second switch group through respective ones of the coupling capacitors,
wherein each of the first and second driving signal output circuits is adapted to control the driving signal to be input therefrom to thereby switch between the ON and OFF states of each of the MOSFETs making up a respective one of the first and second switch groups.

7. An uninterruptible power supply configured as the voltage equalization circuit as defined in claim 5 or 6, which is configured such that the light-emitting element provided in each of the driving signal output circuits is connected to a light-emitting element driver circuit which is connected to one or more of the energy storage cells making up the first to third series circuits, so as to allow the one or more energy storage cells to be used as a power supply for operating the light-emitting element driver circuit, and the push-pull circuit provided in each of the driving signal output circuits is connected to one or more of the energy storage cells making up the first to third series circuits, so as to allow the one or more energy storage cells to be used as a power supply for operating the push-pull circuit.

8. A voltage equalization circuit constructed by: connecting in series N modules each provided as the voltage equalization circuit as defined in claim 5 in which the number n is defined as $n_i$, wherein i is an integer of 1 to N (N being an integer of 2 or more) (each of the N modules will hereinafter be referred to as "the i-th module"); and connecting an energy storage cell to each position between the second series circuits and between the third series circuits in directly-connected two of the N modules, wherein a reference potential point of the push-pull circuit comprised in the driving signal output circuit for switching between the ON and OFF states of each of the MOSFETs comprised in the i-th module is connected to one of the energy storage cells comprised in the i-th module.

9. A voltage equalization circuit constructed by:
alternately connecting, in parallel, (i) m series circuits each of which is constructed by connecting n energy storage cells in series (wherein m is an integer of 1 or more, and n is an integer of 2 or more) and (ii) m or m±1 and multiple series circuits each of which is constructed by connecting (n−1) energy storage cells in series (except for cases where the total number of parallel-connected series circuits is (4L−2), wherein L is a natural number); and providing first and second switch groups, wherein the voltage equalization circuit is configured to:

when each of a plurality of switches making up the first switch group is turned on, attain a first connection state in which an individual one of the energy storage cells comprised in each of the series circuits is connected in parallel to one or more of the energy storage cells comprised in the one or more series circuits connected in parallel to the series circuit having the individual energy storage cell, to form a plurality of parallel circuits; and, when each of a plurality of switches making up the second switch group is turned on, attain a second connection state in which an individual one of the energy storage cells comprised in each of the series circuits is connected in parallel to one or more of the energy storage cells comprised in the one or more series circuits connected in parallel to the series circuit having the individual energy storage cell, to form a plurality of parallel circuits different from the parallel circuits formed in the first connection state, so as to equalize voltages of the energy storage cells making up the respective series circuits according to switching between the first and second connection states, and wherein:

the first switch group is made up by positioning field-effect transistors in each of the parallel circuits formed in the first connection state, and arranged such that the each of the parallel circuits formed in the first connection state includes a field-effect transistor adapted to avoid blocking a current having one of opposite polarities in the each of the parallel circuits, and a field-effect transistor adapted to avoid blocking a current having the other polarity in the each of the parallel circuits; and the second switch group is made up by positioning field-effect transistors in each of the parallel circuits formed in the second connection state, and arranged such that the each of the parallel circuits formed in the second connection state includes a field-effect transistor adapted to avoid blocking a current having one of opposite polarities in the each of the parallel circuits, and a field-effect transistor adapted to avoid blocking a current having the other polarity in the each of the parallel circuits.

* * * * *